United States Patent
Baker

[15] 3,636,917
[45] Jan. 25, 1972

[54] OPTICAL-MONITORING APPARATUS UTILIZING FIBER OPTICS

[72] Inventor: Martin L. Baker, Valencia, Calif.

[73] Assignee: Optical Coating Laboratory, Inc., Santa Rosa, Calif.

[22] Filed: June 29, 1970

[21] Appl. No.: 50,844

[52] U.S. Cl. .............................. 118/9, 118/48, 250/219 TH, 356/38
[51] Int. Cl. ........................................................ B05c 11/00
[58] Field of Search .......................... 118/4, 6, 7, 8, 48–49.5; 117/DIG. 2; 356/37, 38, 161, 210; 250/219 TH

[56] References Cited

UNITED STATES PATENTS

| | | | |
|---|---|---|---|
| 2,315,282 | 3/1943 | Snow | 356/210 |
| 2,656,845 | 10/1953 | Lindsay | 250/219 TH X |
| 2,973,686 | 3/1961 | Dreyfus et al. | 356/108 |
| 3,016,464 | 1/1962 | Bailey | 250/219 TH |
| 3,065,665 | 11/1962 | Akhtar et al. | 356/210 |
| 3,017,512 | 1/1962 | Wolbert | 250/83.3 |
| 3,185,024 | 5/1965 | McCreanor | 250/219 TH X |
| 2,478,206 | 11/1969 | Gaglione | 356/38 X |
| 3,549,264 | 12/1970 | Christie | 356/210 |

FOREIGN PATENTS OR APPLICATIONS 1,373,302  8/1964  France..............................250/219 TH

*Primary Examiner*—Morris Kaplan
*Attorney*—Flehr, Hohback, Test, Albritton & Herbert

[57] ABSTRACT

Optical-monitoring apparatus utilizing fiber optics for use with a chamber to monitor material being evaporated from a source having an aperture plate through which vapors being evaporated can be evaporated onto a substrate with fiber optic means for supplying light to the substrate and fiber optic means for receiving light reflected from the material deposited on the substrate.

12 Claims, 8 Drawing Figures

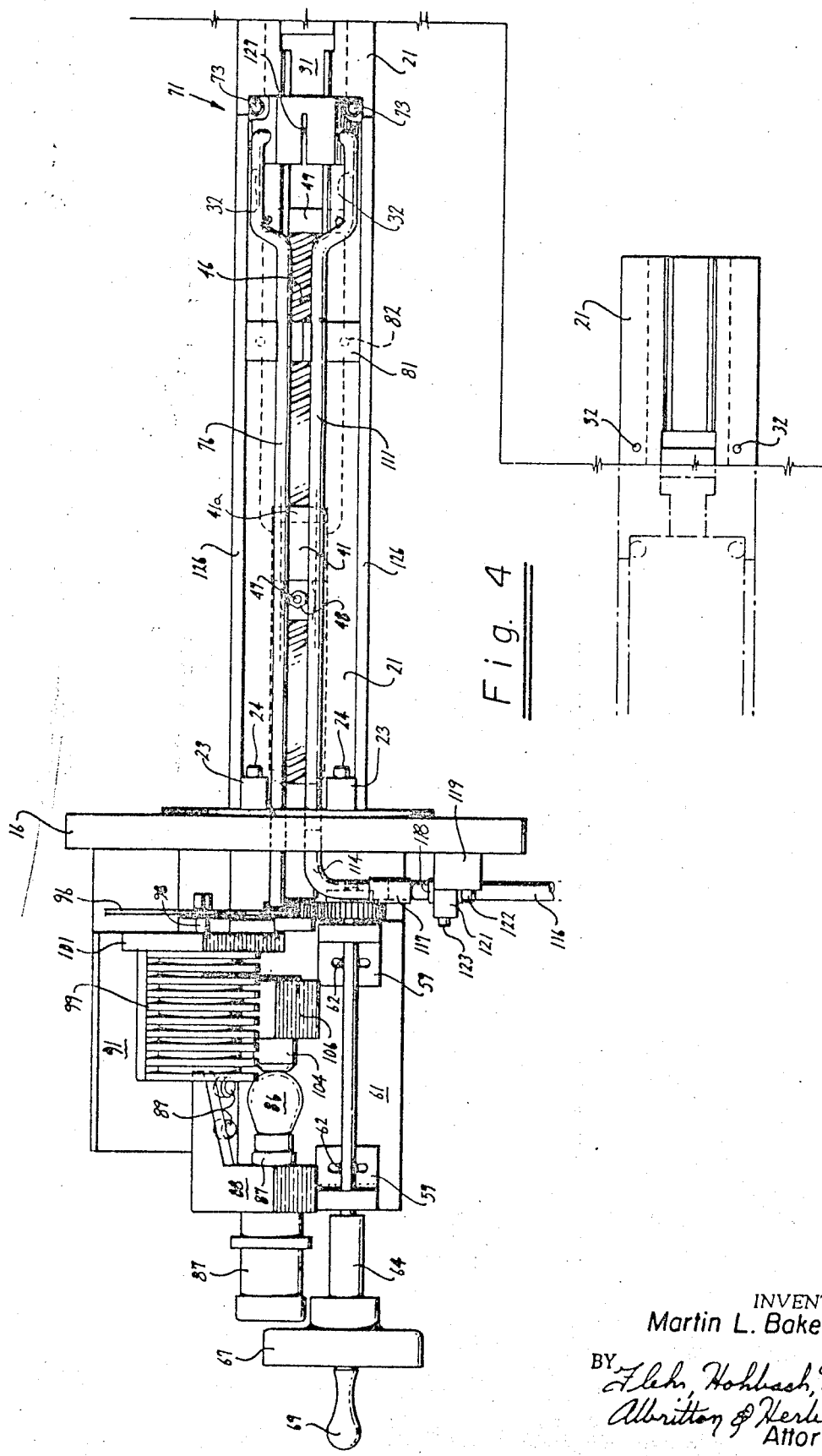

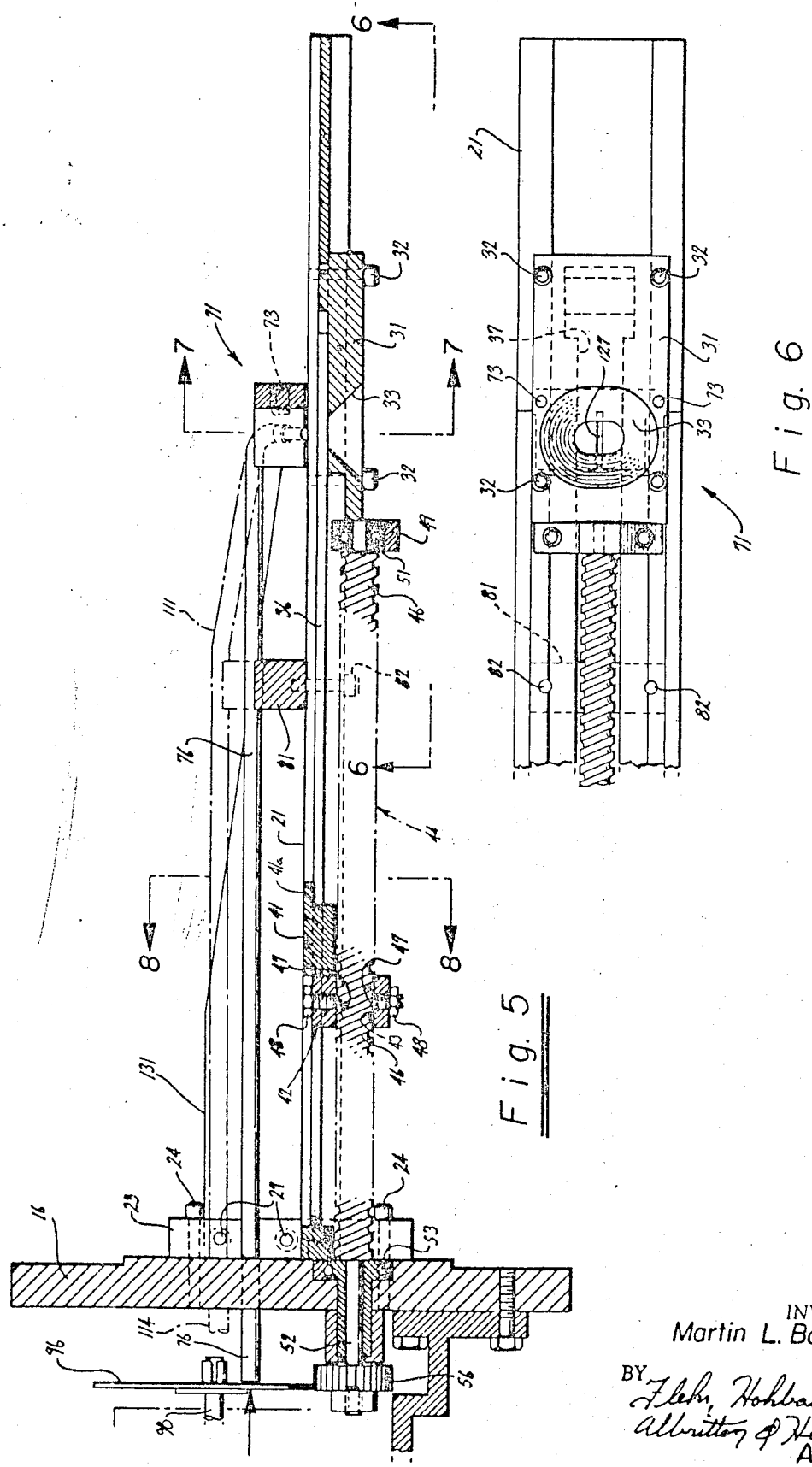

OPTICAL-MONITORING APPARATUS UTILIZING FIBER OPTICS

BACKGROUND OF THE INVENTION

Optical-monitoring apparatus has heretofore been provided. However, in certain applications, such apparatus has not made it possible to obtain sufficiently accurate control. In other words, it has been difficult to provide a repeatable process utilizing such optical monitoring apparatus. There is, therefore, a need for a new and improved optical-monitoring apparatus.

SUMMARY OF THE INVENTION AND OBJECTS

The optical-monitoring apparatus is for use with a chamber for monitoring material being evaporated from a source in the chamber. The apparatus consists of an aperture plate which has an opening therein adapted to receive vapors from the source as the material is evaporated. The aperture plate is adapted to receive a substrate which overlies the opening which can receive vapor from the vapor stream emanating from the source. Means is provided for advancing successive portions of the substrate over the opening. A source of light is provided exterior of the chamber and means is provided for chopping the light beam emanating from the source of light. Fiber optic means is provided for carrying the chopped light into the chamber and directing it onto the backside of the substrate. Additional fiber optic means is provided for receiving light reflected by the coating carried by the substrate and carrying it to the outside of the chamber. Means is provided for monitoring the light passing from the additional fiber optic means.

In general, it is an object of the present invention to provide an optical-monitoring apparatus which is very accurate.

Another object of the invention is to provide apparatus of the above character which can be utilized in conjunction with a vacuum chamber under conditions of high heat.

Another object of the invention is to provide apparatus of the above character which utilizes fiber optics for carrying the light.

Another object of the invention is to provide apparatus of the above character which is relatively simple and which can be economically manufactured.

Another object of the invention is to provide apparatus of the above character which is relatively simple to operate.

Additional objects and features of the invention will appear from the following description in which the preferred embodiment is set forth in detail in conjunction with the accompanying drawings.

BRIEF DESCRIPTION OF THE DRAWINGS

FIG. 4 is a top plan view of the apparatus shown in FIG. 1.

FIG. 5 is an enlarged cross-sectional view of a portion of the apparatus.

FIG. 6 is a bottom plan view of a portion of the apparatus shown in FIG. 5 taken along the line 6—6 of FIG. 5.

DESCRIPTION OF THE PREFERRED EMBODIMENT

The optical-monitoring apparatus 11 is adapted to be mounted upon a vacuum chamber 12. Only one wall 13 is shown of the vacuum chamber. The vacuum chamber is of a type which has sources from which material is adapted to be evaporated to provide a vapor stream which can be utilized for coating substrates carried within the vacuum chamber.

Figure 1:
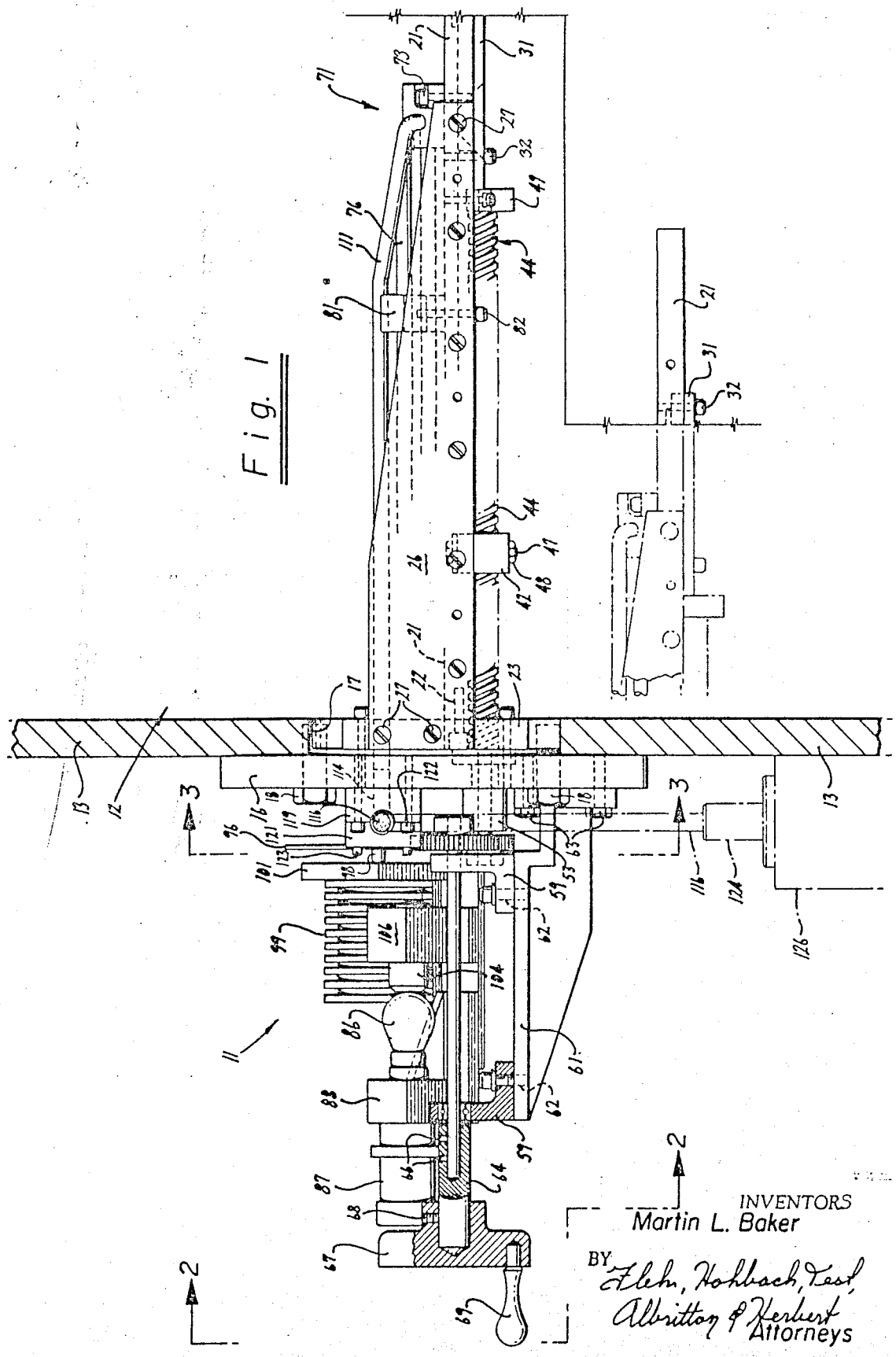
FIG. 1 is a side elevational view, partly in cross section, of an optical-monitoring apparatus incorporating the present invention.
Figure 2:
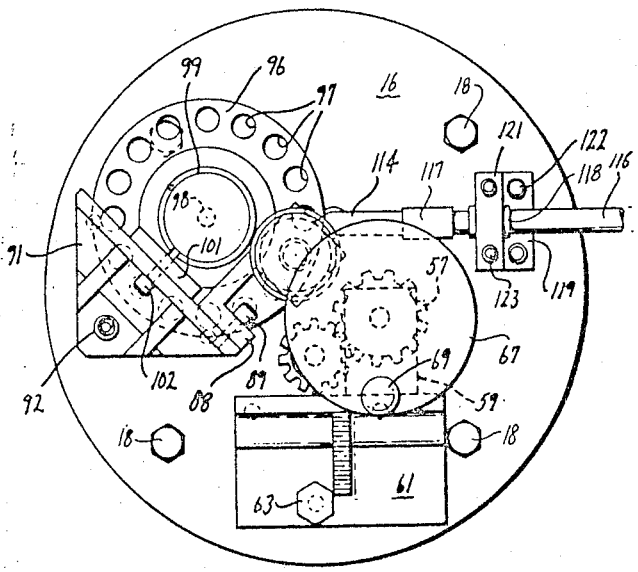
FIG. 2 is a view looking along the line 2—2 of FIG. 1.
Figure 3:
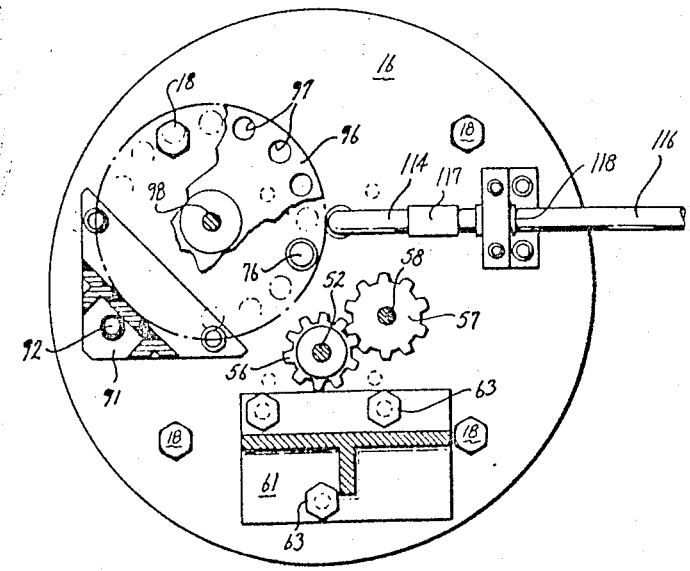
FIG. 3 is a cross-sectional view taken along the line 3—3 of FIG. 1.
Figure 7:
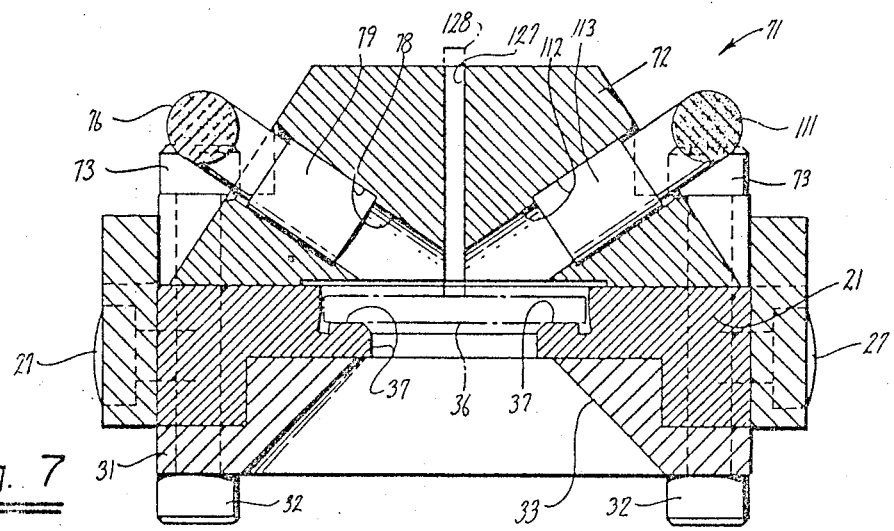
FIG. 7 is an enlarged cross-sectional view of a portion of the optical-monitoring apparatus.

The optical monitoring apparatus consists of a circular mounting plate 16 which is adapted to be positioned over an opening 17 provided in the wall 13 of the vacuum chamber. The mounting plate 16 is adapted to be held in place by capscrews 18. A slide rail 21 is secured to the mounting plate 16 by suitable means such as capscrews 22. The slide rail 21 extends into the chamber as can be seen particularly from FIG. 1. A pair of support blocks 23 are mounted in spaced-apart positions upon the mounting plate 16 by suitable means such as capscrews 24. A pair of slide rail supports 26 are provided which are secured to the support blocks 23 and to the slide rail 21 by capscrews 27.

An aperture plate 31 is secured to the slide rail 21 by capscrews 32. The aperture plate 31 is provided with an aperture 33 which, as can be seen particularly in FIG. 6, is oval shaped and is provided with inclined sidewalls so that the walls which define the opening are inclined downwardly and outwardly from the aperture 33. The aperture 33 is adapted to receive vapors from the source within the vacuum chamber. The aperture plate 31 is formed in such a manner that it is adapted to receive a substrate which is adapted to be coated by the vapors from the evaporation source. As hereinafter explained, means is provided for advancing successive portions of the substrate over the aperture so that successive measurements can be made with the monitoring apparatus. In the present embodiment of the invention, the substrate 36 is in the form of a rectangular slide or piece of glass which is adapted to seat within a recess 37 provided in the slide rail 21.

Means is provided for advancing the substrate 36 so that successive portions of the substrate overlie the aperture 33 in the aperture plate 31. Such means consists of a pusher 41 which is slidably mounted in the slide rail 21. The pusher is provided with a portion 41a which overlies the rearward extremity of the substrate 36. The pusher 41 is adapted to be engaged by an actuator nut 42. The nut 42 is provided with a bore 43 through which an actuator screw 44 extends. The actuator screw 44 is provided with a helical groove 46 which is adapted to be engaged by a pair of pins 47 which are threaded into the actuator nut 42 from opposite sides thereof and are locked in position by nuts 48. The actuator screw 44 extends in a direction which is parallel to the slide rail 21. It is mounted in a fixed horizontal position with respect to the slide rail by a bearing bracket 49 which carries a bearing 51 in which one end of the actuator screw 44 is rotatably mounted. The other end of the actuator screw 44 is provided with a shaft 52 which is rotatably mounted in a rotary motion housing 53.

The shaft 52 is adapted to be rotated by a spur gear 56 which is secured to the outer end thereof. The spur gear 56 is driven by another spur gear 57. The spur gear 57 is affixed to an actuator shaft 58. The actuator shaft is rotatably mounted in a pair of spaced brackets 59. The brackets 59 are secured to a large bracket 61 by capscrews 62. The bracket 61 is secured to the mounting plate 16 by capscrews 63. A stub shaft 64 is secured to the outer end of the actuator shaft 58 by capscrews 66. A crank or wheel 67 is secured to the stub shaft 64 by a capscrews 68. A handle 69 is mounted offcenter on the crank 67 for operation of the crank.

Figure 8:
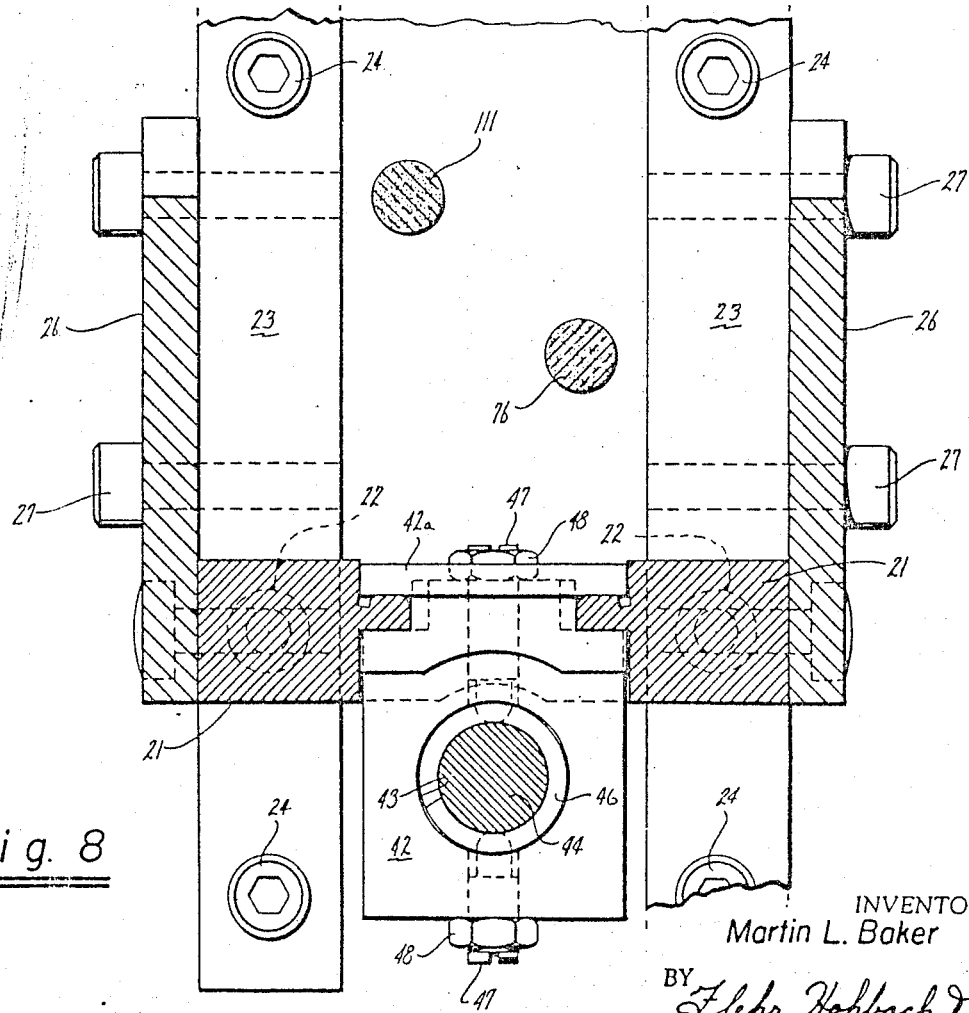
FIG. 8 is another enlarged cross-sectional view of a portion of the optical-monitoring apparatus.

A sensor head assembly 71 is provided which generally overlies the portion of the substrate 36 which overlies the aperture 33 in the aperture plate 31. The sensor head assembly 71 consists of a block 72 which is secured to the slide rail 21 by a pair of capscrews 73. Means is provided for supplying light to the sensing head assembly and consists of a light or image conduit 76. The conduit 76 is formed of a suitable material such as a plurality of fiber optics which have been fused together to provide a solid fiber optic bundle. The solid fiber optic bundle is bent in the manner shown particularly in FIGS. 1 and 4 and has one end which extends into an inclined bore 78 provided in the block 72. A sleeve 79 is mounted on the end of the light conduit 76 as shown particularly in FIG. 8. As will be noted from FIG. 8, the bore 78 is open so that light emitted from the light conduit 76 will strike the substrate 36 at a substantial angle for a purpose hereinafter described.

The light or image conduit 76 extends rearwardly along the slide rail 21 and is supported by a combination support and guide block 81 which is secured to the slide rail 21 by capscrews 82. The light or image conduit 76 extends through the mounting plate 16 and is carried by a sleeve 83 provided in the mounting plate. As can be seen from FIG. 4, the rear extremity of the conduit 76 has a planar surface which is parallel to the surface of the mounting plate 16. A source is provided for supplying light to the light or image conduit 76 and consists of a lamp 86 mounted in a socket 87. The socket 87 is carried by a lamp bracket 88 which is secured by capscrews 89 to a large bracket 91. The bracket 91 is secured to the mounting plate 16 by capscrews 92.

Means is provided for chopping the light emanating from the source of light which is emitted by the lamp 86 and consists of a chopper disc 96 which is provided with a plurality of holes 97. The disc is secured to a shaft 98 so that it rotates with the shaft. The shaft 98 is the output shaft of a motor 99 which is supported by a motor bracket 101 secured to the bracket 91 by capscrews 102. The chopper disc 96 is positioned in such a manner that as it is rotated, the holes 97 are moved into registration with the end of the light or image conduit 76 and between the light source formed by the lamp 86 and the end of the image conduit so that light energy which is chopped at a predetermined frequency is supplied to the light or image conduit 76. The chopper disc is rotated at any desired speed as, for example, 3,600 or 1,800 r.p.m. It also can be provided with any number of holes to give the desired chopping frequency as, for example, 500 or 1,000 cycles per second.

In order to employ the capabilities of the image conduit 76 to its maximum, it is desirable to illuminate the entrance end of the image conduit with light energy having an $f$ number which is equal or substantially equal to the $f$ number of the image conduit 76. A projection lens 104 is provided for this purpose and focuses the energy from the lamp 86 onto the image conduit 76 at the proper $f$ number. The projection lens 104 is carried by a bracket 106 mounted upon the bracket 91.

As hereinafter explained, the chopped light energy is supplied to the rear side of the clear substrate 36. A certain amount of this light energy will be reflected by any coating carried by the substrate. This reflected light is received by a light or image conduit 111 which is formed in a manner similar to the light or image conduit 76. One end of the same extends into a bore 112 provided in the block 72 and is carried by a sleeve 113 mounted in the bore. As can be seen, the bore 112 is inclined at a substantial angle with respect to the substrate 36 and with respect to the bore 78. It is positioned in such a manner that it is adapted to receive light reflected by a coating carried by the lower or second surface of the substrate 36.

The light or image conduit 111 is supported by the block 81 and extends rearwardly into the mounting plate 16. Another image conduit 114 bent into a right angle also extends into the mounting plate 16 and has one end abutting the end of the image conduit 111 in the mounting plate 16. The other end of the image conduit 114 is in abutment with a fiber optics flexible cable 116 of a conventional type. A sleeve 117 is provided for coupling the ends of the light or image conduit 114 and the end of the fiber optics cable 116. Another sleeve 118 is mounted on the flexible cable 116 and is secured to a block 119 by a clamp 121. The block 119 is secured to the mounting plate 16 by capscrews 122 and the clamp 121 is secured to the block 119 by capscrews 123.

The cable 116 is bent downwardly and is connected into an adapter 124. The adapter 124 converts the light energy which is in circular form from the flexible cable 116 into a line so that it acts as the entrance slit for a monochrometer 126. The monochrometer can be of any suitable type such as one manufactured by Bausch & Lomb. It is important that the entrance $f$ number of the monochromator be substantially the same as the $f$ number chosen at the entrance side of the image conduit 76 to obtain the optimum transfer of light energy.

A housing 131 is secured to the slide rail 21 and extends the entire length of the slide rail and covers the various parts of the optical monitoring apparatus 11 which extends into the vacuum chamber.

The block 72 which forms a part of the sensor head assembly 71 is provided with a slot 127 which bisects the angle formed by the bores 78 and 113. The slot 127 is adapted to receive a slide 128 which is adapted to be inserted into the slot and rest on top of the substrate 36 and serves to eliminate reflection from the first or top surface of the clear substrate 36. The slide 128 is formed of any suitable material such as stainless steel. It is preferably provided with roughened surfaces to reduce surface reflections to a minimum.

Operation of the optical-monitoring apparatus may now be briefly described as follows. Let it be assumed that the optical-monitoring apparatus is mounted in a vacuum chamber 12 in the manner hereinbefore described. Let it also be assumed that it is desired to coat a plurality of articles within the vacuum chamber and to monitor the coating operation with the optical-monitoring apparatus. As is well known to those skilled in the art, in order to perform a coating operation, it is necessary to evaporate the material which is to be utilized for the coating. Typically, this material is heated until it vaporizes to form a vapor stream within the vacuum chamber which will impinge upon the articles being coated and also at the same time will pass through the opening 33 and will be deposited upon the clear substrate 36 carried by the optical-monitoring apparatus.

Light from the lamp 86 passes through the projection lens 104 and is then chopped by the chopper disc 96 and then passes into the image conduit 76 and travels to the sensing head assembly 71 where the light is directed at a substantial angle against the substrate 36. There will be a reflection of this chopped light by the second surface of the substrate dependent upon the amount of coating material which has been deposited upon the second surface of the clear substrate 36. This reflected light is transmitted by the light or image conduit 111 through the flexible fiber optics cable 116 and then to the monochrometer which is utilized for examining the energy at various wavelengths in the reflected light energy. The output of such a monochrometer is supplied to a tuned amplifier which ensures that unchopped ambient light will be greatly attenuated and thence to a recorder to inform the operator of the vacuum chamber the characteristics of the coating which has been applied to the substrate 36.

It will be noted that with the optical-monitoring apparatus 11 herein provided that the aperture 33 in the optical-monitoring apparatus immediately overlies the source so that the optical-monitoring apparatus will in fact receive more coating material than is received by the articles being coated. It is possible that the substrate 36 can receive five or six times as much coating material as the articles being coated. With such a ratio, it can be seen that much greater accuracy can be obtained with such optical-monitoring apparatus which is particularly important for very thin layers.

As soon as a layer of desired thickness has been deposited upon the articles being coated, a shield can be placed over the source and then the substrate 36 can be advanced to place a clean portion of the substrate over the aperture 33. This is accomplished by operation of the crank 67. Typically, the crank can be turned one revolution to advance the substrate sufficiently far so that an uncoated area is presented to the aperture 33 and to the sensor head assembly 71.

With the sensor head assembly 71 which has been provided, it can be seen that the light travels only a very short distance from the point where it exits from the conduit 76 and strikes the substrate 36 and then is received by the conduit 111. The angular relationships between the exit end of the conduit 76 and the entrance end of the conduit 111 are fixed. This ensures stability within the sensing head assembly 71 and eliminates or minimizes what might be characterized as noise or drift.

It should be appreciated that it is the light energy which is reflected by the second surface of the clear substrate 36 which is particularly important in the optical-monitoring apparatus.

The slide 138 ensures that the reflections from the first surface of the clear substrate 36 are eliminated. This is important because reflections from the first surface would appear as stray light on the signal which is generated by the monochrometer. Because the exit end of the light or image conduit 76 and the entrance end of the light or image conduit 111 are inclined at an angle with respect to the second surface of the clear substrate 36, it is possible to minimize the effect of ambient light as, for example, ambient light from the source which is located directly below the aperture 33 of the optical-monitoring apparatus 11. The conduits 76 and 111 are angled in such a manner that the light energy from the source is beyond the angle of acceptance for the ends of the conduits 76 and 111. It is for this reason that the conduits 76 and 111 are relatively insensitive to strong ambient light from directly below.

By way of example, it has been found possible to operate the optical-monitoring apparatus 11 at relatively high temperatures. For example, it can operate 24 hours a day for many days at temperatures of 200° C.

It is apparent from the foregoing that there has been provided an optical-monitoring apparatus which is particularly useful in many coating operations. It is a second surface reflection monitor utilizing fiber optics. Increased control has been obtained by the position in which the vapor stream is monitored to thereby obtain an increased ratio of monitor coating to the coating being placed on the articles. This also makes possible the monitoring of very thin layers, extremely repeatable.

I claim:

1. In an optical-monitoring apparatus for use with a chamber to monitor material being evaporated from a source in the chamber, an aperture plate having an opening therein adapted to receive vapors from the source, said aperture plate being adapted to receive a substrate which overlies said opening and which can receive vapor from the vapor stream, means for advancing successive portions of the substrate over the opening, a source of light exterior of the chamber, fiber optic means for carrying light from the light source and directing it onto the side of the substrate opposite the side receiving vapors, fiber optic means for receiving light reflected by any coating carried by the substrate and conducting it outside the chamber, means for monitoring the light from the fiber optic means for receiving light and blocking means adapted to rest upon said opposite side and intermediate the incident and reflected lights whereby to block out top surface reflection.

2. Apparatus as in claim 1 wherein the exit end of the fiber optic means for carrying light is disposed at an angle with respect to the substrate and where the entrance end of the fiber optic means is also disposed at an angle with respect to the substrate.

3. Apparatus as in claim 1 wherein said first named and additional fiber optic means include at least portions thereof which are formed of solid fiber optic bundles.

4. Apparatus as in claim 1 together with means for chopping the light energy before it is supplied to the substrate.

5. Apparatus as in claim 1 wherein said aperture is positioned so that it generally overlies the source.

6. Apparatus as in claim 1 together with means for focusing the light energy from the source of light onto the fiber optic means with an $f$ number substantially the same as the $f$ number of the fiber optic means.

7. Apparatus as in claim 6 wherein the means for monitoring the light from the fiber optic means has an entrance $f$ number substantially the same as the $f$ number of the means for focusing the light energy onto the fiber optic means.

8. Optical-monitoring apparatus for use with a vacuum chamber to monitor material being evaporated from a source in the vacuum chamber, a mounting plate secured to the vacuum chamber, an aperture plate carried by the mounting plate and having an aperture therein adapted to receive vapors from the source, said aperture plate being adapted to receive a substrate which overlies said opening and which can receive vapor from the vapor stream, means for advancing successive portions of the substrate over the aperture in the aperture plate, a sensing head assembly carried by the mounting plate and overlying the aperture in the aperture plate, said sensing head assembly including a block having first and second bores therein, said first and second bores being disposed at an inclined angle with respect to the substrate, a source of light carried by the mounting plate and disposed outside the chamber, a light conduit for carrying light from the source of light and supplying it through one of said bores so that the light will impinge upon the second surface of the substrate and of the coating carried thereby and will be reflected through the other bore a light conduit mounted in said other bore for receiving the light and carrying it through the mounting plate to a point outside the chamber, said block being provided with a slit which bisects the angle between said bores, and a slide disposed in said slit and adapted to rest upon said substrate to minimize top surface reflections from said substrate.

9. Apparatus as in claim 8 together with means for chopping said source of light before it is supplied to the light conduit.

10. Apparatus as in claim 8 together with a slide rail for mounting said aperture plate on said mounting plate, wherein said substrate is in the form of a slide slidably mounted in said slide rail, and wherein said means for advancing successive portions of the substrate includes a pusher member slidably mounted in said slide rail and adapted to engage said slide, and screw means for advancing said pusher.

11. Apparatus as in claim 10 wherein said screw means includes an actuator nut adapted to engage the pusher, an actuator screw threaded into said nut and rotatably mounted on said slide rail so that it extends longitudinally of the slide rail, and crank means for causing rotation of said actuator screw.

12. Apparatus as in claim 8 wherein said light conduits are in the form of solid fiber optic bundles.

* * * * *